United States Patent [19]

Cordell

[11] Patent Number: 5,367,520
[45] Date of Patent: Nov. 22, 1994

[54] METHOD AND SYSTEM FOR ROUTING CELLS IN AN ATM SWITCH

[75] Inventor: Robert R. Cordell, Middletown, N.J.

[73] Assignee: Bell Communcations Research, Inc., Livingston, N.J.

[21] Appl. No.: 981,715

[22] Filed: Nov. 25, 1992

[51] Int. Cl.$^5$ .............................................. H04Q 11/04
[52] U.S. Cl. .................................... 370/60; 340/825.8
[58] Field of Search ....................... 370/60, 60.1, 58.1, 370/94.1, 85.15, 61, 85.2, 58.2, 58.3; 379/272; 340/825.79, 825.8, 825.5

[56] References Cited

U.S. PATENT DOCUMENTS

| | | | |
|---|---|---|---|
| 4,706,150 | 11/1987 | Lebizay et al. | 379/272 |
| 4,929,939 | 5/1990 | Varma et al. | 372/272 |
| 4,942,574 | 7/1990 | Zelle | 370/85.15 |
| 5,020,052 | 5/1991 | DePrycker et al. | 370/61 |
| 5,130,975 | 7/1992 | Akata | 370/60 |
| 5,130,984 | 7/1992 | Cisneros | 370/94.1 |
| 5,157,654 | 10/1992 | Cisneros | 370/94.1 |
| 5,166,926 | 11/1992 | Cisneros | 370/94.1 |
| 5,210,744 | 5/1993 | Yamanaka et al. | 370/60 |

OTHER PUBLICATIONS

Performance of a Non–Blocking Space Division Packet Switch in a Time Variant Non–Uniform Traffic Environment, M. J. Lee and S. Li, 1990 International Conference on Communications, Atlanta, Apr. 1990.

Large Packet Switch and Contention Resolution Device, Arturo Cisneros, XIII International Switching Symposium, Stockholm, Sweden, May 27–Jun. 1, 1990.

Performance of Packet Switches with Input and Output Queueing, I. Iliadis and W. Denzel, 1990 IEEE, pp. 0747–0753.

Primary Examiner—Douglas W. Olms
Assistant Examiner—Huy D. Vu
Attorney, Agent, or Firm—Leonard Charles Suchyta; James W. Falk

[57] ABSTRACT

A method and a system for routing cells in an ATM switch. The switch which is input buffered, employs a multiplicity of crosspoint switch planes operating simultaneously in parallel, and whose outputs are combined by an output-buffered second stage. A traffic controlling or path assignment switching stage disposed before the crosspoint switch planes improves performance in the presence of correlated traffic. The switching stage may either control the traffic randomly or adaptively. Input concentration and output expansion functions within the switch are also disclosed. The use of an "unfair" or a predictable preference contention resolution device (CRD) in each of the crosspoint switch planes is possible in another embodiment of the invention. Advantages of the method and system include linear growth with large N in the size and complexity of both the switching circuits and the contention resolution circuits. Switch performance tends to gracefully degrade with failures in switch planes and contention resolution devices. Dense, low-cost memory with simple FIFO addressing schemes can be used to realize both the input and output buffered stages.

25 Claims, 5 Drawing Sheets

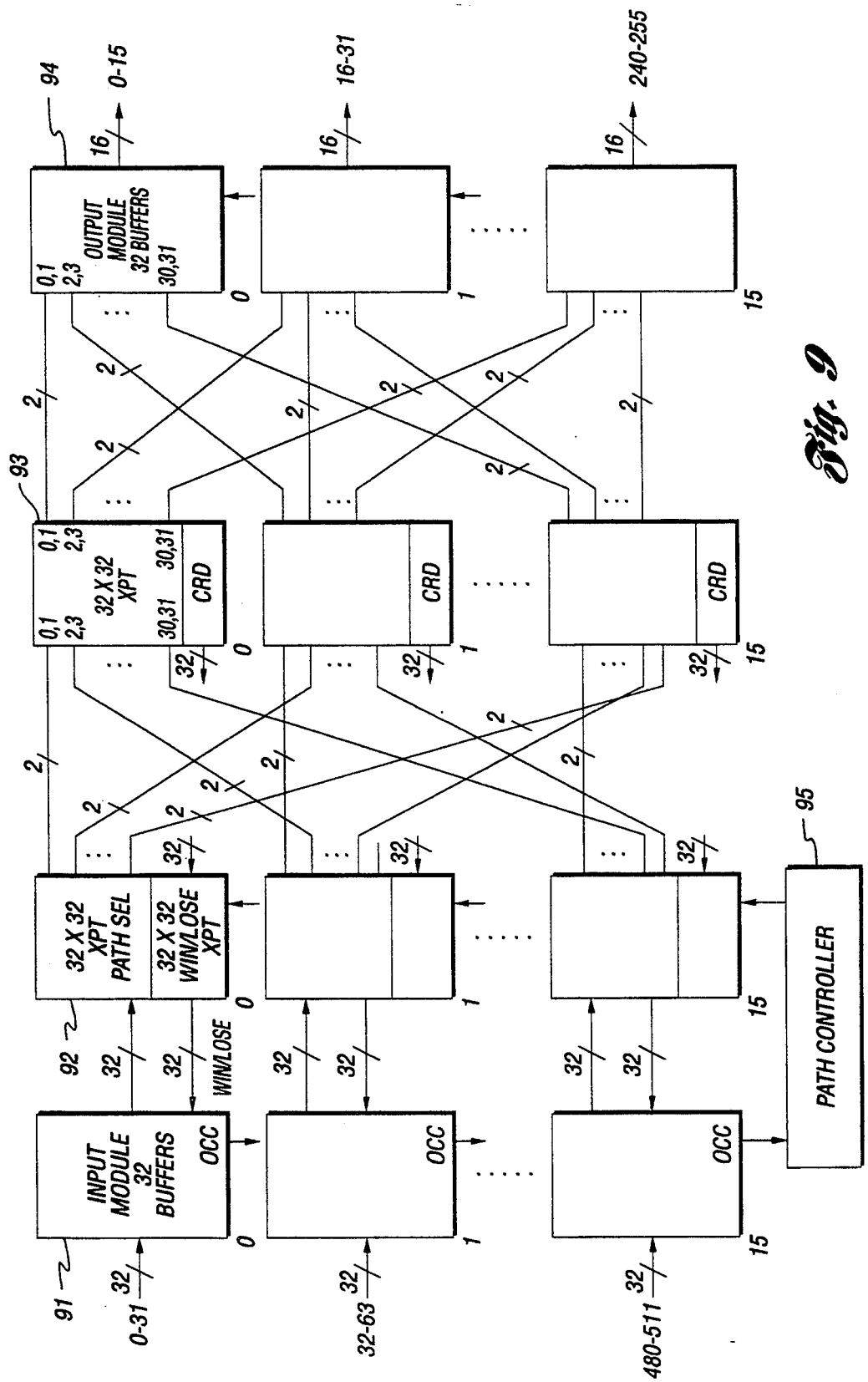

METHOD AND SYSTEM FOR ROUTING CELLS IN AN ATM SWITCH

CROSS-REFERENCE TO RELATED APPLICATIONS AND PATENT

This application is related to co-pending applications entitled "A Packet Address Look-Ahead Technique For Use In Implementing A High Speed Packet Switch" filed Dec. 18, 1990 and now U.S. Pat. No. 5,166,926 and "A Technique For Resolving Output Port Contention In A High Speed Packet Switch" also filed on Dec. 18, 1990 and now U.S. Pat. No. 5,157,654. This application is also related to issued U.S. Pat. No. 5,130,984 entitled "Large Fault Tolerant Packet Switch Particularly Suited In Asynchronous Transfer Mode (ATM) Communication". The three patents are owned by the assignee of the present application.

TECHNICAL FIELD

This invention relates to methods and systems for routing cells in an ATM switch and, in particular, to methods and systems for routing cells in an ATM switch using a fully parallel terabit switch architecture.

BACKGROUND ART

The complexity of the switch fabric and some related functions in a switch often grows significantly faster than linearly, frequently as N squared, where N is the number of lines. This is especially a problem in large broadband ATM switches where the resulting growth in size and power make the required high speed performance even more difficult to achieve.

An ATM switch distinguishes itself from a circuit switch in that it must reconfigure itself essentially every cell period. Furthermore, it must deal with a cell stream from each of its input ports wherein each cell may be destined for a different output port. This leads to contention among cells for output ports, since it is entirely possible for cells from two input ports to be destined for the same output port at the same time. This implies the need for storage somewhere in the switch so that all cells can eventually reach their intended output port. In some architectures, this also means that a contention resolution device (CRD) is required to act as a traffic cop, determining which contending cells have access to an output port.

In many architectures, contention that occurs for an output port means that some portion of the switch is idle while a cell waits, implying degradation in the throughput of the switch. Because of the statistical nature of the arrivals of cells at the input ports and of the destinations, there usually exists some small but finite probability of cell loss, which must be minimized. Finally, even if there is no cell loss, periods of considerable contention lead to large numbers of cells being instructed to wait somewhere in the storage media of the switch, implying long delays through the switch for some cells some of the time, leading to variations in transport delay or cell jitter.

Input-Buffered Crosspoint Switches

A simple ATM switch can be constructed by preceding a crosspoint array with a FIFO input buffer on each of its input ports, as shown in FIG. 1. A contention resolution device (CRD) then examines all of the output port requests, comparing them against one another, and decides which FIFOs may empty a cell into the switch core, permitting only one cell to be routed to any given output port. Cells that contend and lose will get a chance to leave their FIFO during the next cell period. If none of these input buffers overflows, then there will be no cell loss. A losing contender at the head of one of these queues or "lines" forces all cells behind it to wait, even if they are destined for an output port that is free. This is called "Head of Line" (HOL) blocking.

This type of architecture is called an "Input Buffered Switch". The switch described above is a single-stage switch. In a multi-stage switch, it is possible for there to be contention for the intermediate output ports of each stage, leading to the possibility of blocking or the need for storage and perhaps contention resolution at each stage.

Although the input buffered switch employing a crosspoint switching element is conceptually straightforward, this architecture has the following disadvantages:

1. The complexity of the crosspoint grows as N squared (if a single-stage crosspoint fabric is employed).
2. The contention resolution device must resolve contention over all N input ports, and its complexity eventually tends to grow as N squared as N gets large.
3. The throughput of the switch is only 58% with uniformly distributed random input traffic due to contention and HOL blocking. Further degradation can occur with bursty input traffic as discussed in the paper entitled "Performance Of A Nonblocking Space-Division Packet Switch In A Time Variant Non-Uniform Traffic Environment" by M.J. Lee and S. Li in the 1990 INTERNATIONAL CONFERENCE ON COMMUNICATIONS, Atlanta, April 1990.
4. It is difficult to maintain cell order from a given tributary to the same output port when efficient input concentration schemes are employed that can apply input cells to more than a single dedicated input queue. This is because the cell delay for cells entering different queues can be different because the various queues may experience different amounts of cell contention and HOL blocking.

Throughput Degradation

For the purposes of this specification, the capacity of a switch is the number of ports times the bandwidth of each port. The throughput of the switch is the sustained maximum amount of information that can flow through the switch while maintaining an acceptable level of cell loss probability, such as $<10^{-9}$. Throughput is less than capacity due to throughput degradation caused by contention. Peak throughput equals capacity.

The Terabit Switch loosely derives its name from the scenario of serving 64,000 sonet STS-3 155 Mb/s lines each with a duty cycle of 10%. This amounts to a throughput of 1.0 Tb/s. Such a Terabit Switch would have to have a capacity at least large enough such that under uniformly distributed random traffic it would be left with 1.0 Tb/s of throughput. Furthermore, it is strongly desirable that it be able to maintain 1.0 Tb/s of throughput under the further degraded conditions of some moderately bursty traffic.

In the simple architecture above, throughput degradation occurs because there is only one path to each output port. Unless the input traffic destinations are perfectly organized, the output ports cannot be utilized 100 percent of the time. As mentioned above, uniformly distributed random input traffic has a frequency of occurrence of contention for output ports such that throughput is only 58 percent of capacity. In principle, this can be dealt with by overbuilding the switch by a factor of about two.

However, the problem is much more serious for traffic that is correlated and bursty. For example, while the average information rate directed to a given output port may be within its bandwidth, it may happen that several sources direct long bursts of data to that port during approximately the same time interval. In this case, contention can extend over long periods of time. More serious throughput degradation can result because many input queues can suffer from extended HOL blocking, forcing many otherwise-routable cells to sit and wait. This in turn leads to the need for much larger buffers to hold the cells until they can be routed. Even if the buffers are large enough to avoid cell loss, the implied peak cell delay translates to larger amounts of cell transport delay variation, or cell jitter.

An input-buffered switch with 16,384 ports (after concentration) operating at 155 Mb/sec would have a capacity of 2.54 Tb/s and a throughput under uniformly distributed random traffic of 1.47 Tb/s. This is referred to as a 2:1 overbuilt switch. It can withstand an additional 32 percent throughput degradation due to bursty traffic and still maintain a throughput of 1.0 Tb/sec.

Other Architectures

Because of the disadvantages cited with reference to the switch of FIG. 1, many researchers have paid less attention to these architectures in favor of other architectures, such as some multi-stage architectures that grow as N log N, like the Batcher-Banyan switches.

Another architecture is the output-buffered switch illustrated in FIG. 2. In this switch, each input port has its own bus that has access to the buffer of every output port. The buffer is constructed so that it can store all inputs applied to it simultaneously. One way to construct such a buffer is to precede a FIFO with a time division multiplexer (TDM) and operate the FIFO at m times the rate of the individual input lines, where m is the number of input lines. If an input cell has the address of a given output port, it simply enters that port's buffer. This idealized version of the output buffered switch is obviously impractical for large switches, as its complexity and the demands on the output buffer grow rapidly. Practical output buffered switches pare down this idealized switch in a way that results in an acceptable combination of size and cell loss performance.

An important characteristic of the output buffered switch is that it requires no input queuing and no contention resolution. It can thus "combine" the cell streams from a multiplicity of sources in a simple fashion if the number of sources is not too large. This observation is a key to the architecture proposed here.

SUMMARY OF THE INVENTION

An object of the present invention is to provide a method and system for routing cells in an ATM switch wherein the architecture for the switch fabric allows the growth of most of the key functions of the switch to be essentially linear for large N. The parallelism afforded by this architecture also allows the use of low-cost, low-power, albeit slower technology, further aiding the power problem. By allowing the use of a dense, simple main switching core that can be physically separated from the majority of the rest of the switch, power density can also be kept to a reasonable value.

Another object of the present invention is to provide a method and system for routing cells in an ATM switch wherein the switch is a two-stage hybrid input/output buffered switch that employs multiple crosspoint switching planes operating in parallel. A third switching stage is located before the crosspoint switching planes to effectively manipulate the statistics of the traffic offered to the switching planes. This statistical path assignment technique addresses the blocking tendency of two-stage switch architectures and helps make switch performance under bursty traffic loads more like that under uniformly distributed random traffic loads.

Yet still another object of the present invention is to provide a method and system for routing cells from subscriber ports to output ports of an ATM switch by interactively and efficiently concentrating the input to the ATM switch while at the same time preserving cell ordering.

Still another object of the present invention is to provide a method and system for routing cells in an ATM switch by choosing a suitable interconnection arrangement between path selection switches and central crosspoint switch planes combined with an appropriate path adaptation algorithm to substantially reduce cell loss probability.

In carrying out the above objects and other objects of the present invention, a method is provided for routing cells from input ports to output ports of an ATM switch. The method includes the steps of providing a plurality of switching planes having inputs and outputs and storing the cells appearing on the input ports of the ATM switch in a plurality of input queues. The method also includes the step of assigning the input queues to the inputs of the switching planes in a controlled fashion to more uniformly distribute the flow of cells across the switching planes. The switching planes route cells along paths therethrough to the outputs of the switching planes in parallel. Finally, the method includes the steps of combining and storing the cells appearing on the outputs of the switching planes and retrieving and applying the combined stored cells to the output ports of the ATM switch.

In one embodiment of the invention, preferably the step of assigning is controlled so that the paths of the stored cells from the input queues to the switching planes are scrambled.

In another embodiment of the invention, preferably the step of assigning is controlled in an adaptive fashion wherein the step of assigning is based on the cell occupancies of the input queues.

Further in carrying out the above objects and other objects of the present invention, a method is provided for routing cells from subscriber ports to output ports of an ATM switch. The ATM switch also includes input ports. The method includes the steps of providing a plurality of switching planes having inputs and outputs, storing the cells appearing on the input ports of the ATM switch in a plurality of input queues and assigning the subscriber ports to the input queues based on the status of the input queues. The method also includes the step of assigning the input queues to the inputs of the switching planes in a controlled fashion to more uniformly distribute the flow of cells across the switching planes. The switching planes route cells along paths therethrough to the outputs of the switching planes in parallel. Finally, the method includes the step of combining and storing the cells appearing on the outputs of the switching planes, and retrieving and applying the combined stored cells to the output ports of the ATM switch.

Yet still further in carrying out the above objects and other objects of the present invention, a method is provided for routing cells from input ports to output ports of an ATM switch. The method includes the step of providing a plurality of switching planes having inputs and outputs. Each of the switching planes has a contention resolution device (CRD) with no fairness circuitry. The method also includes the steps of storing the cells appearing on the input ports of the ATM switch in a plurality of input queues and assigning the input queues to the inputs of the switching planes in a controlled adaptive fashion to more uniformly distribute the flow of cells across the switching planes. The switching planes route cells along paths therethrough to the outputs of the switching planes in parallel. Finally, the method includes the steps of combining and storing the cells appearing on the outputs of the switching planes, and retrieving and applying the combined stored cells to the output ports of the ATM switch.

Further in carrying out the above objects and other objects of the present invention, systems are provided for carrying out each of the above methods.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 9 is a schematic block diagram of a relatively smaller, simpler version of an ATM switch also utilizing the method and system of the present invention.

BEST MODE FOR CARRYING OUT THE INVENTION

In the architecture disclosed hereinbelow, a switch of the present invention is essentially input buffered in nature, attacking the problems of such input buffered switches.

Although this architecture is not wedded to the use of a simple crosspoint switching core, the use of crosspoint switches is very desirable because their simplicity and regular interconnect make them ideal for VLSI implementations in array sizes that are not so large that they suffer too much from the N squared growth characteristic. In fact, in reasonable array sizes, the crosspoint is probably the densest, lowest power switching technology presently available. It is thus desirable to find ways to achieve the needed switching throughput by combining multiple crosspoint switching planes of reasonable size in such a way that a non-blocking switch of larger size results.

Of course, throughput of a switch using a given-size single switch plane can be made adequate by running the switch core, input buffers and CRD at a high enough rate, and then buffering the outputs back down to the base rate. A $512 \times 512$ crosspoint plane operating at 2.5 Gb/sec could provide a peak throughput of over one Terabit per second, for example.

There are at least two ways to achieve such high throughput with multiple switch planes operating at a lower rate (such as the base rate of 155 Mb/s). The first is to access m planes serially and overlap their operation so that all of the planes are working all of the time. This is equivalent to using a single plane operating at m times the rate of the individual planes. The second way is to operate m planes in parallel, as disclosed hereinbelow.

Figure 1:
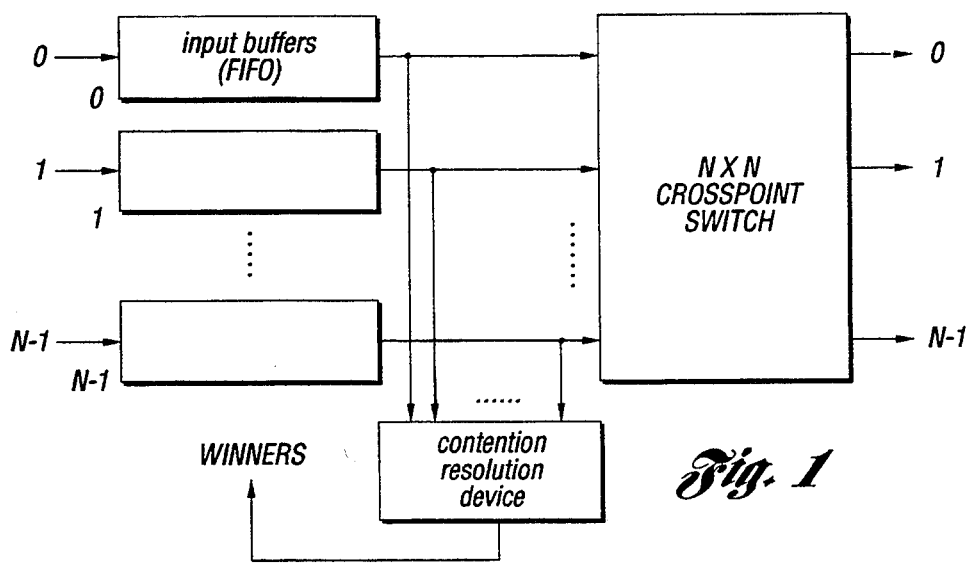
FIG. 1 is a schematic block diagram of a simple input-buffered ATM switch.
Figure 2:
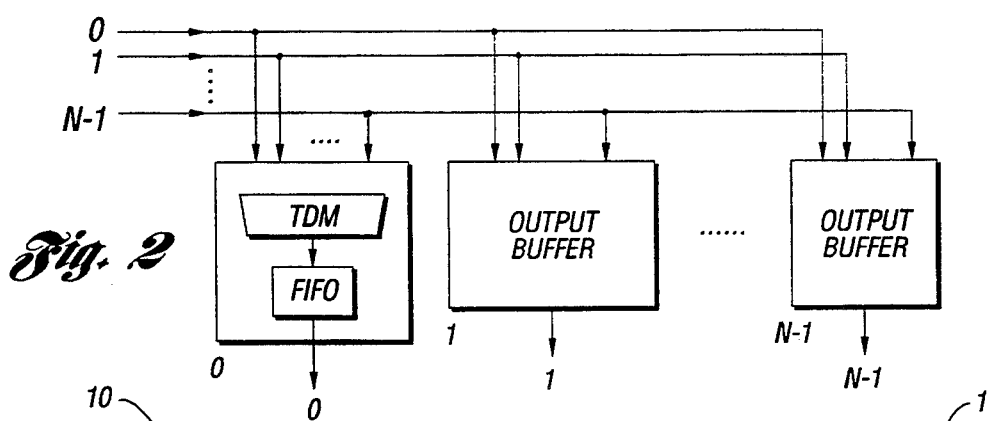
FIG. 2 is a schematic block diagram of a simple output-buffered switch.
Figure 3:
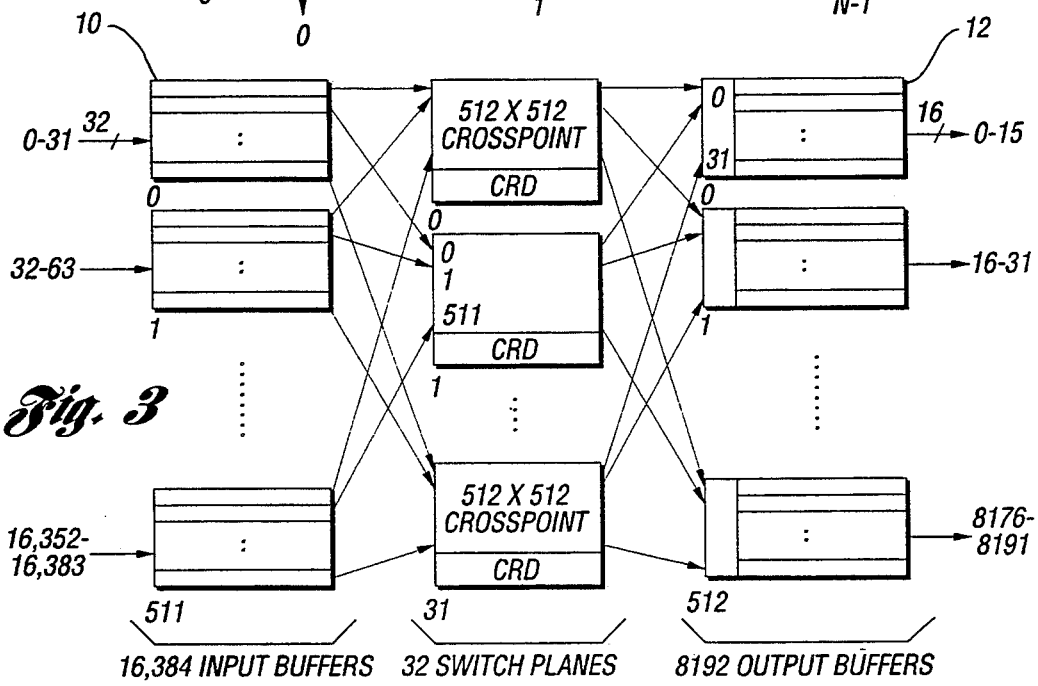
FIG. 3 is a schematic block diagram of a fully parallel architecture utilizing the method and system of the present invention.

The proposed architecture for a one-Terabit (throughput) version of this switch is shown in FIG. 3. A one-Terabit (capacity) switch will have 8192 155 Mb/sec active ports (after concentration). The switch in FIG. 3 deals with the throughput degradation characteristic simply by overbuilding the switch by a factor of two, resulting in 16,384 active ports on the switch core, assuming that the switch core is operating at 155 Mb/sec. There are also 16,384 input queues, although 8192 queues with dual outputs could be employed (but probably at minimal, if any, useful savings).

The switch consists of 16,384 input buffers feeding the inputs of thirty-two $512 \times 512$ crosspoint planes whose outputs are combined by 8192 output buffers, each of which has 32 simultaneous inputs (one from the same-numbered output port of each crosspoint plane). As shown in FIG. 3, each input queue is dedicated to a certain numbered input port of a particular crosspoint plane.

32 input buffers define an Input Buffer Group (IBG) 10; the 32 buffers in such a group 10 each connect to a different one of the 32 switch planes. The 16,384 input ports, or queues, of the switch therefore comprise 512 Input Buffer Groups 10. The input structure of the switch will subsequently be organized as 64 Input Modules, each containing 256 input buffers arranged into 8 Input Buffer Groups 10. Each input module serves 1024 unconcentrated subscriber lines.

Each output of the 32 crosspoint planes can be routed to one of 16 possible output buffers. Such a group of 16 output buffers, all having access to the same 32 lines from the crosspoint planes, is here referred to as an Output Buffer Group (OBG) 12, as shown in detail in FIG. 4.

The particular switch plane through which a cell passes is referred to as the "path". Every subscriber input port has access to every switching plane by means of a path-selection switch stage discussed hereinbelow. Flexibility of access to the different switch planes can also be provided by means of an input concentrator also discussed hereinbelow.

The switch of FIG. 3 is a two-stage switch: an input-buffered switch stage followed by an output buffered switch stage. Because an output-buffered stage is employed to combine the outputs of multiple first stage elements, blocking does not occur between the two stages. Each of the 32 switch planes of the first stage ("core") function independently, each with its own contention resolution device. There are 32 relatively independent paths whereby an input can reach a given output port. Although the switch does not have blocking between the two stages there can be inadequate throughput on one or more of these 32 paths in the architecture as shown in FIG. 3, depending on traffic statistics. This is a form of blocking that is characteristic of two-stage architectures, and this potential problem will be dealt with hereinbelow.

For purposes of illustration, it is here assumed that each cell has prepended to it a switch routing tag that includes 16 bits of physical address information. The first 9 bits select one of the 512 output ports of the crosspoint plane on which the cell enters the switch. The next 4 bits select one of the 16 output buffers in the Output Buffer Group 12 that is accessible from that crosspoint output port. The last three bits are employed in a 1:8 expander 18 that serves 8 subscriber output ports 16 from a single active switch output port 14. Thus, the cells are treated as being self-routed. However, there are many hardware alternatives in achieving self-routing-like behavior. Assuming conventional input ATM cell length of 53 bytes, the cell length within the core of the switch is thus at least 53 +2=55 bytes.

Because it is desirable to operate the core of the switch synchronously with the line rate (i.e., at 155.52 Mb/s of a multiple thereof), the longer intraswitch cells are accommodated at a cost of 3.8 percent of the switch throughput. However, this cost almost balances the throughput gain achieved when the SONET overhead of incoming lines is stripped off (leaving only ATM cells), causing the effective bit rate of the STS-3 to drop from 155.52 Mb/s to 149.76 Mb/s. Because of the "loose joint" provided by the input buffer FIFOs, the bit rate entering the input buffers need not be 155.52 Mb/s when the switch core clock is that rate; it need only be less than that on a long-term average, and occasionally-generated idle cells will effectively make the long-term rates identical. Thus, techniques like bit stuffing are unnecessary.

An incoming cell enters one of the 16,384 input queues as determined by an input concentrator (not shown), and then enters one of the 512 input ports on one of the 32 switch planes, as determined by which input queue it is coming from. It does not matter where the cell enters the switch core, as all ports of all planes can reach any switch output port. The cell then proceeds to one of the 512 output ports on its plane. That output port is bussed to 16 output buffer queues. The cell enters one of those queues (which is one of the 8192 switch output ports 14). From there the cell enters the output expander 18 where it is finally directed to one of eight subscriber output ports 16.

Two-stage Switch Blocking

As mentioned above, there is a potential problem with the architecture as shown in FIG. 3. A given input buffer is hard-wired to a given switch plane, and a given-numbered switch plane output port can serve 16 switch output queues. This means that there is only a single 155 Mb/s path from a particular group of 512 input queues to a particular group of 16 output queues. If even only two of those input queues are directing a sustained aggregate information rate of more than 155 Mb/sec to any two of the group of 16 output queues, that portion of the switch will be overloaded. Throughput will be limited by contention for the particular output port of the switch plane to which both input queues are wired. This occurs in spite of the fact that there are a total of 32 155 Mb/s paths available to feed a given Output Buffer Group 12. The problem is that the two (or more) input ports have the misfortune of being routed to the Output Buffer Group 12 through the same switch plane, or path.

In a sense, this problem results from correlated input traffic statistics, and is an exacerbated version of the increased throughput degradation that occurs in ordinary switches under loading of traffic with correlated statistics. If the incoming traffic was uniformly distributed among the 32 switching planes, the blocking (or "throughput pinch") cited above would not occur.

This last observation, together with the fact that it matters not on what switch plane or port cells enter the switch core, is the key to the improved architecture of the present invention that not only deals with the throughput pinch, but also alleviates throughput degradation due to correlated traffic.

The Scrambled Path Switch

Because the switch architecture of the present invention has 32 independent paths (i.e., switch planes) to each output port, there is an opportunity to alter the traffic statistics as seen by each of those switch planes. In a sense, if the traffic distribution could be "whitened" one could make the switch act more like it would under a uniformly distributed random input load.

To do this, a third switching stage is provided which is not controlled by cell address information. Instead, this switching stage is controlled by a form of pseudo-random address generator that causes the assignment of input queues to switch planes to be continually scrambled. A new path assignment might be made on every cell period border. The concept here is much like that of scrambling data before applying it to a transmission system so as to control d.c. and spectral content statistics.

Figure 5:
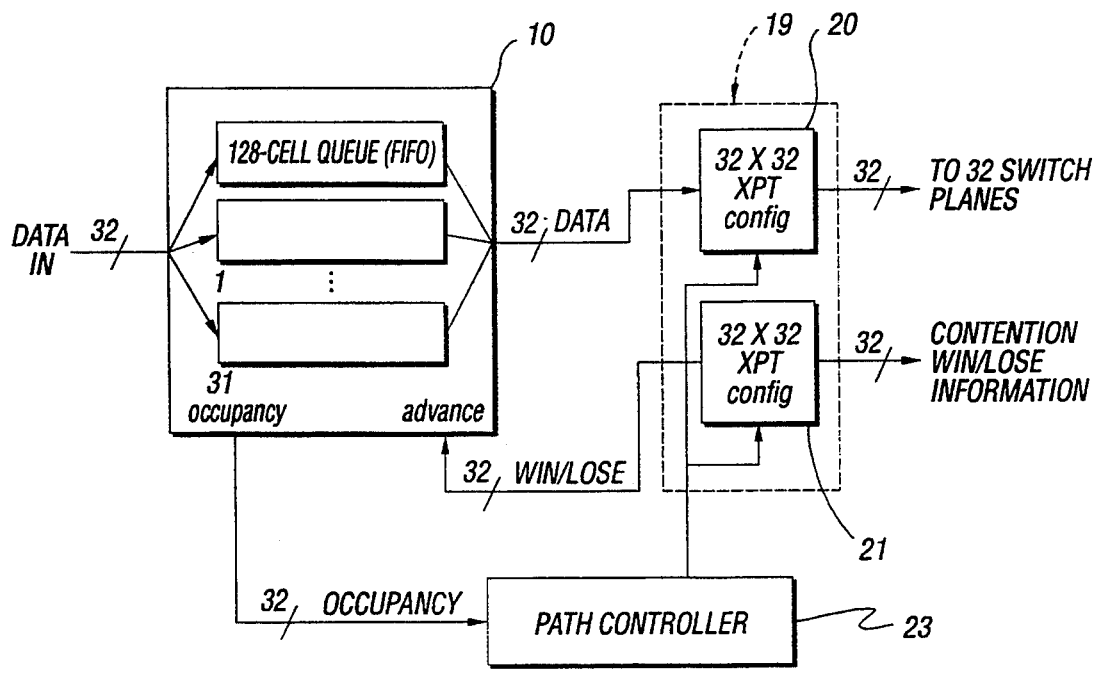
FIG. 5 is a more detailed schematic block diagram of an input buffer group with a path assignment switch.

As shown in FIG. 5, this path assignment switching stage is placed between the input queues and the crosspoint switch planes. Each Input Buffer Group 10 has a 32×32 path assignment switch 20 that makes the association between input queue and switch plane. Every input queue thus has the ability to be routed to any of the 32 switch planes. A second 32×32 switch 21 with the inverse settings of the path assignment switch 20 routes the win/lose contention resolution decisions back to the appropriate input buffer. The two 32×32 portions of the Path Assignment Switch can be implemented in a single chip, generally indicated at 19.

Because of its location in the architecture, the state of the path assignment switch 20 has absolutely no effect on the destination of a cell or on cell ordering. It is there solely to modify the statistics of the path that cells take through the switch in getting to their destination. The destination is not affected because in this type of switch it does not matter where a cell enters the switch fabric. The cell ordering is not affected because there is not further queuing between the path assignment switch 20 and the output of the crosspoint plane.

The settings of the 32×32 path assignment switch 20 are established by a Path Controller 23. Many possibilities exist for controlling the 512 path assignment switches 20 in a pseudo-random fashion such that they are adequately uncorrelated with each other. It is probably not necessary that the relative ordering among any group of 32 assignments in an Input Buffer Group 10 be changed. A simple algorithm might therefore be to add a path assignment address offset, modulo 32, to all of the addresses feeding a given path assignment switch 20. A different pseudo random generator for each of the 512 port assignment switches 20 would generate that number.

In summary, the path scrambling seeks to more uniformly distribute the information flow across the 32 available switch planes. In so doing, it breaks up correlated traffic bursts as seen by any given switch plane. It thus not only attacks the blocking problem of this architecture, but also should reduce the tendency for correlated traffic to cause excessive HOL blocking because contenders will not be locked together fighting on the same switch plane throughout the duration of burst overlap. It is possible that the scrambled path switch may also relax somewhat the need for fairness in the contention resolution algorithm. The issue of fairness in contention resolution will be dealt with further hereinbelow.

The introduction of this third stage of switching is low in cost because the path assignment switches are small. Furthermore, this stage provides a means for graceful failure degradation with respect to switch planes, since an input buffer now has access to any switch plane.

In fact, the failure of a switch plane does not cause a corresponding loss in input buffer resources. It would only mean that 1/32 of the time an input buffer would be connected to a "dead" switch plane, where it would be blocked (by "failure to win contention") until the pseudo-random path assignment changed. This switching stage may also provide a useful port for maintenance access as well if it is implemented as a 33 ×33 switch, for example.

The path-Adaptive Switch

The scrambled path switch described above is promising, but there may be an even better way to achieve the altering of the traffic statistics. The same path assignment switch 20 may be controlled statistically based on the state of occupancy of the input queues feeding it. It is likely that most, of the time the majority of assignments of queues to switch planes do not need changing.

If a queue has the misfortune of being assigned to a switch plane where it is in serious contention for a particular output port, the queue will begin to fill up. In a conventional switch, it has no choice but to wait in that line. In the path-adaptive switch, the queue is given an alternative to waiting in the same line. If the queue gets too full, it can be switched to another path, where the likelihood of extended blocking is much lower. The statistical distribution of queue occupancies will naturally tend to decorrelate path changing decisions among contenders.

There are many possibilities for the algorithm that operates in the path controller 23. In general, its action probably should be responsive to the occupancies of the queues whose paths are being controlled. One thing that is attractive about the path-adaptive switch is that all of the 512 Path Controllers 23 in the switch can be identical. Consequently, explicit differences need not be built into or programmed into the path controllers 23 (e.g., different pseudo-random sequences) to assure uncorrelated path changing actions among the Path Controllers 23. This is so because of the statistical nature of the queue occupancies being used to institute action; it is unlikely that the occupancies of two queues in contention will cross the same threshold at the same time. Furthermore, it is easy to design the algorithm so that the nature of a path change, when one is made, depends on the history of previous changes throughout that entire Input Buffer Group 10, and it is unlikely that these histories will be the same.

A simple algorithm might work as follows: the 16 buffers whose occupancy most exceeds a threshold, and whose occupancy has increased since the last cell period, will be switched on a cell period border. That threshold might be made a bit higher for queues that have been associated with a particular path for an extended period. A switch of a buffer path assignment will be accomplished with a pairwise exchange between that buffer's assignment and another buffer's assignment. The buffer with the greatest excess occupancy chooses its new path first, followed in order of excess occupancy by the others. A buffer that is marked for a change but has already been changed by an earlier pairwise exchange does not choose a new path when its turn comes. In choosing a new path, a buffer might target a path number that corresponds to its current path number plus an increment, the sum being taken modulo-32. The increment number could be chosen so that in 32 consecutive changes the buffer will have tried all of the 32 different paths. Different increment numbers can be chosen for the first, second, etc. buffer path selections.

Many variations on the above approach are obviously possible, and serious candidates must be evaluated through simulation and further study. However, the key observation is that the situation for a queue with high occupancy is very likely to improve with almost any change in its path.

While it has been assumed that path-changing action would take place within one ATM cell period, and in every cell period, this need not be the case. Since the change in the path is only done to change traffic statistics, it is not critical when it is done, as long as it is done on a cell border. For this reason, there should not be any speed-critical issues in the Path Control logic.

Switching Planes

Although any technology which can provide a single-stage non-blocking switch can be used for the switching planes that comprise the core first stage of the switch of the present invention, VLSI crosspoints are especially attractive because of their simplicity, density and regular interconnect among identical chips. Synchronous crosspoints have been described and demonstrated up to 32×32 at speeds of over 155 Mb/sec; and work is ongoing on 64×64 crosspoints. Potentially, 64 ×64 crosspoint chips can operate at 622 Mb/sec in 1-micron CMOS. Test chip results demonstrating high speed circuits in 1-micron CMOS suggest that the CMOS technology is viable at 622 Mb/sec rates. Furthermore, based on predictions made at the 1990 Custom Integrated Circuits Conference, it is likely that 256×256 crosspoint chips that can operate at 622 Mb/sec will be achievable in the year 2000 in a 0.25-micron BiCMOS technology.

Pin Bandwidth and Chip Communications

It is likely that the bandwidth of inter-chip communications will continue to be the limiting factor in the size and performance of VLSI crosspoints, rather than on-chip circuit complexity. Pin bandwidth is defined as the number of package signal pins times the maximum reliable signal rate per pin that can support synchronous communication to a neighboring chip. The packaging technology will tend to dominate this much more than the underlying device technology. This tends to suggest that technologies that provide higher circuit complexity on a single chip will be more effective than a faster technology whose circuit density is limited.

For this reason, it seems unlikely that GaAs technology will surpass BiCMOS (or perhaps even advanced CMOS) in crosspoint technology. For example, at a given maximum pin bandwidth, a 64×64 CMOS crosspoint operating at 622 Mb/sec provides more net switching function than a 16×16 GaAs crosspoint operating at 2.5 Gb/sec.

Crosspoint Switching Planes

If 64×64 devices are employed at 155 Mb/sec, then the switching planes for the architecture above would each comprise an 8×8 array of 64 crosspoint chips, resulting in a 512×512 crosspoint plane. The required 32 planes would then total 2048 crosspoint chips. To this would be added some smaller number of support chips, such as optical interconnect interfaces, contention resolution devices and array drivers. This would probably add two more columns and one more row to the array of chips, for a total of 90 chips per switching plane, or 2880 chips for all 32 planes.

The crosspoint planes would probably be implemented in one of the emerging Multi-Chip Module (MCM) technologies with solder bump or TAB (Tape Automated Bonding) attachment technology. The 8×8 crosspoint chip array itself can probably be implemented with chips on 0.7 inch centers (400 mil chips with 300 mil "streets"), thus occupying an area of 5.6×5.6 inches. The 9×10 array, including 10 Gb/s optical interconnect interfaces, would occupy an area of 6.3×7.0 inches.

If 622 Mb/sec 64×64 crosspoints are employed, an 8×8 array of these devices could replace four 155 Mb/s planes if arranged in a 4:1 time-multiplexed fashion. This would then result in a switch core with only 8 planes comprising a total of 512 crosspoint chips. If 10 Gb/s optical interconnect chips are employed, then four columns and four rows of interconnect devices would be needed to serve the crosspoint rows and columns. To this would have to be added a column of chips to drive the rows, and at least four CRD chips, for a total of 140 chips for each of the eight switch planes, resulting in a switch core with 1120 chips.

Even with 10 Gb/s optical interconnect technology, the I/O for the switch planes occupies about as much area as the crosspoint switches. Further increases in crosspoint density or speed would have to be accompanied by more dense optical inter-connect technology.

Alternatively, the 622 Mb/sec crosspoints can be used to build a true 622 Mb/sec ATM switch of the same capacity if the buffers are designed to operate at 622 Mb/sec and the number of input and output buffers is reduced to 4096 and 2048, respectively. This would also require that the contention resolution device for each crosspoint plane operate four times as fast.

Contention Resolution

High speed contention resolution device technology that can serve the needs of this architecture is described in the above noted commonly assigned applications and patent. Because contention resolution across N contenders requires that every contender's requested destination be compared with every other contender's requested destination, this process requires N-squared comparisons in one cell period (less than 3 microseconds).

If the N contenders are shifted past a stationary array of the N contenders for comparison, the amount of hardware grows linearly with N as long as the shifting clock can be made fast enough to complete N shifts in one cell period. If N must be larger than this implied maximum value, parallelism must be employed so that two or more comparisons are done on each shift, implying circuit complexity growth in another dimension. Thus, beyond this point the circuit complexity of the CRD increases as N-squared. In reality, things are probably a bit worse than this because the larger circuits will tend to run a bit slower (require more time per shift).

The switch architecture presented here has an advantage with respect to the CRD in that a multiplicity of smaller CRDs can be used instead of one large one, thus keeping the CRDs away from (or at least not far into) the N-squared growth region for a given CRD technology. This architecture requires 32 CRDs that can each resolve 512 contenders in one cell period. In contrast, a single-CRD approach would require a CRD that could operate over 16,384 contenders in one cell period, a device that is well into the N-squared growth region according to the assumptions in the above-noted article.

Each CRD can probably be implemented as a single chip conveniently located on the switch plane that it serves. Communication of only contention winner selections back to the input buffers will then be required. Because the Path Assignment Switch 20 can change the association of input buffers to switch planes on every cell period, the operations of loading the CRD, resolving contention and communicating win/lose information back to the input buffers must be completed in one cell period.

Fairness In Contention Resolution

Some means of enforcing fairness in the process of contention resolution is usually required because the CRD usually operates in a sequential fashion that has a physical arrangement that tends to favor certain ports over others (such as those that have their address comparisons made earliest in a round of contention resolution).

Many schemes for enforcing fairness, including the one in the CRD of the above-noted article work to overcome this natural bias by retaining a history of wins and losses among contenders for a given port. An input port whose comparison point is early in the round and which has just won contention will on the next round thus be made to lose to a contender who previously lost contention and whose comparison occurs later in the process.

In the Scrambled Path and Path Adaptive switches described above, however, an entirely new set of contenders may be present at a given path's CRD during each cell period or round of contention because of changed path assignments. This means that it is difficult or impossible to effectively retain the round-to-round history as required by fairness schemes like the one in the above-noted article. In fact, the straightforward use of such a scheme in the architectures described here without proper retention of the history information could degrade performance. This might occur because a cell that has lost several consecutive contentions and then is assigned to a new path will be treated by the CRD in that new path as a newcomer and may be consequently at an unfair disadvantage in winning contention among cells that have remained in that path for more than one cell period.

Other approaches to assuring the required degree of fairness thus need to be explored. In evaluating such alternative approaches, it should be recognized that the degree of "fairness" needed is only that which assures that all cells eventually get through the switch by some means (within acceptable cell loss probability), and that they not be unduly delayed in doing so (satisfactory cell jitter performance).

The effective enforcement of fairness is most important under correlated traffic conditions. The Scrambled Path and Path-Adaptive switches described herein tend to decorrelate the traffic statistics as seen by the switch planes and CRDs. The Path-Adaptive switch may further tend to mitigate the need for fairness because a port being treated unfairly will tend to migrate to another switch plane anyway, where there is a good chance it will suffer little or no contention for the targeted output port in contention for which it was unsuccessful. It is therefore likely that less effective enforcement of fairness (or even no conventional enforcement of fairness in the CRDs) in these architectures will still make possible good performance.

A number of approaches to incorporating fairness into these architectures exist. In many cases, they will involve conveying additional information along with the cell into the CRD. For example, the occupancy of the buffer from which a cell originates can be conveyed, and cells tagged with higher buffer occupancy can be made to win over cells from smaller queues whose comparisons fall earlier in the round of contention. This scheme raises the question of whether buffers with high offered traffic loads should be effectively given more opportunities to win contention (because their queues will tend to be longer). Such an approach will tend to distribute the pain of congestion over more input buffers. This might actually be desirable. It Is certainly not obvious that a lightly loaded port should get as many chances to win contention as a heavily loaded one.

Another approach might be to tag a cell with a number indicating the number of consecutive losses it has suffered. A cell with many consecutive losses would tend to be given a better chance of winning contention in spite of an otherwise disadvantageous place in the contention resolution sequence.

Finally, as wired in FIG. 3, an input Buffer Group 10 near the top always has an advantage over the lower IBGs 10 if no fairness is implemented in the CRDs, since its lines are wired to CRD ports that have their address comparisons made earlier in a round of contention. This concern can be addressed by wiring the 32 lines from an IBG 10 to different-numbered ports of the different crosspoint planes connected to it. However, the impact on switch wiring complexity and grouping must be considered. Alternatively, the wiring arrangement can be used as shown if a CRD is used that tends to scramble the priority of its input ports by dynamically rearranging itself. For example, if the CRD comparison chain is broken into eight segments, the interconnection of those segments can be altered on a cell period basis to give different effective priority orderings to the segments. This switching approach to obtaining dynamic physical CRD arrangements could be made very simple and be contained within the single CRD chip. It would probably be necessary only for each segment of the chain to select from one of two possible inputs.

Input Buffers

The 155 Mb/sec switch described above requires 16,384 input buffers that can be of a FIFO organization and which must operate at 155 MHz. Although the design and size of the input buffers are subject to studies beyond the scope of this specification, the use of buffers that are non-shared and have a depth of 128 cells (<64 Kbits) is here assumed. Since this can be a major cost contributor to the overall switch fabric, the technology for building these buffers should be a low-cost, high-density memory technology.

A 1 Mbit ASIC DRAM technology would permit implementation of 16 input buffers on a chip, resulting in the complete switch requiring only 1024 input buffer chips. A DRAM technology with a conservative 50 ns row access time and employing 256 write/sense amplifiers would provide adequate speed for interleaved read/write accesses for 16 channels at 155 Mb/sec. Use of more aggressive 4 Mbit ASIC DRAM technology with more write/sense amplifiers would permit implementation of 64 buffers on a chip, reducing the total switch requirement for buffer chips to 256.

Figure 6:
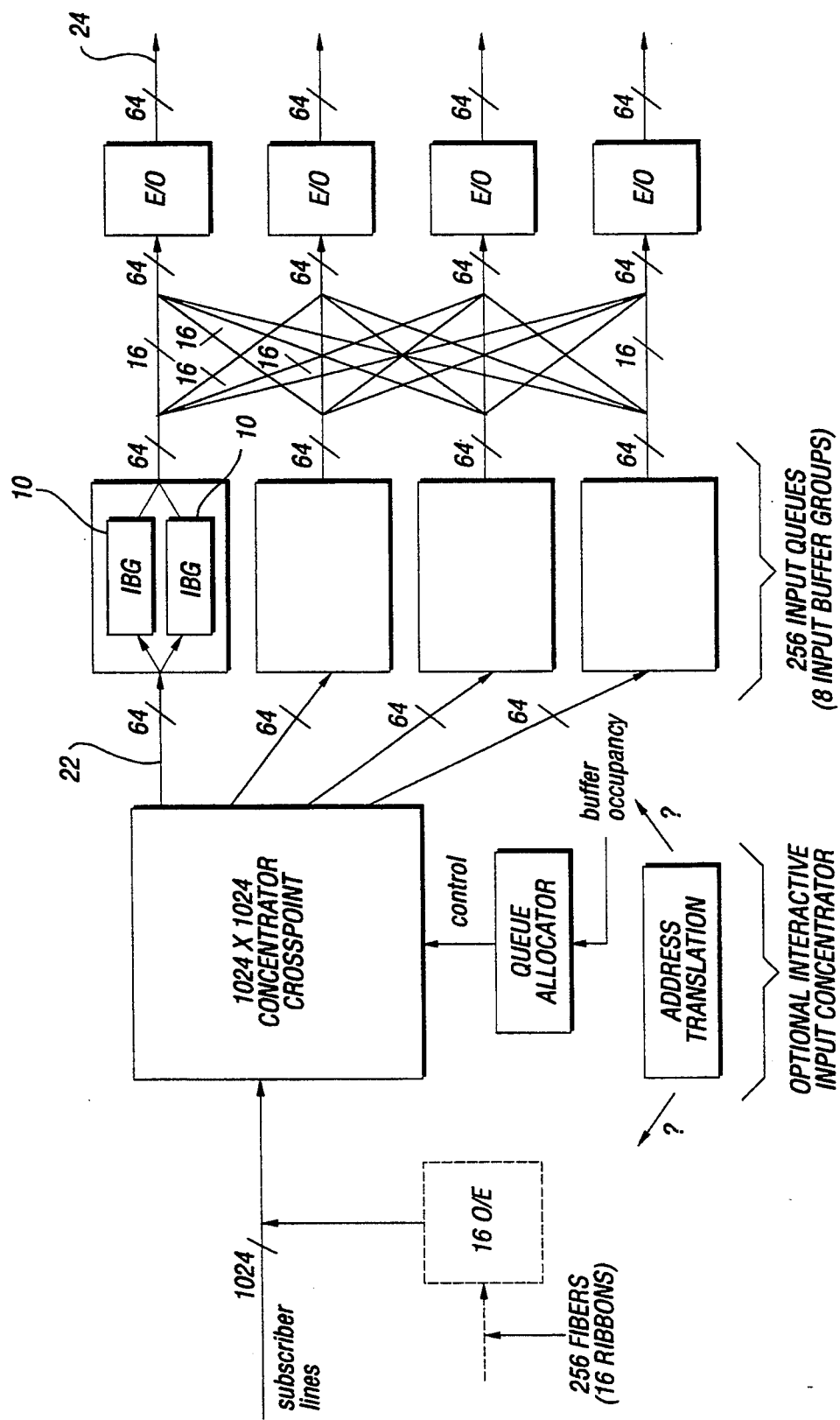
FIG. 6 is a more detailed schematic block diagram of an input module for use in the method and system of the present invention.
Figure 7:
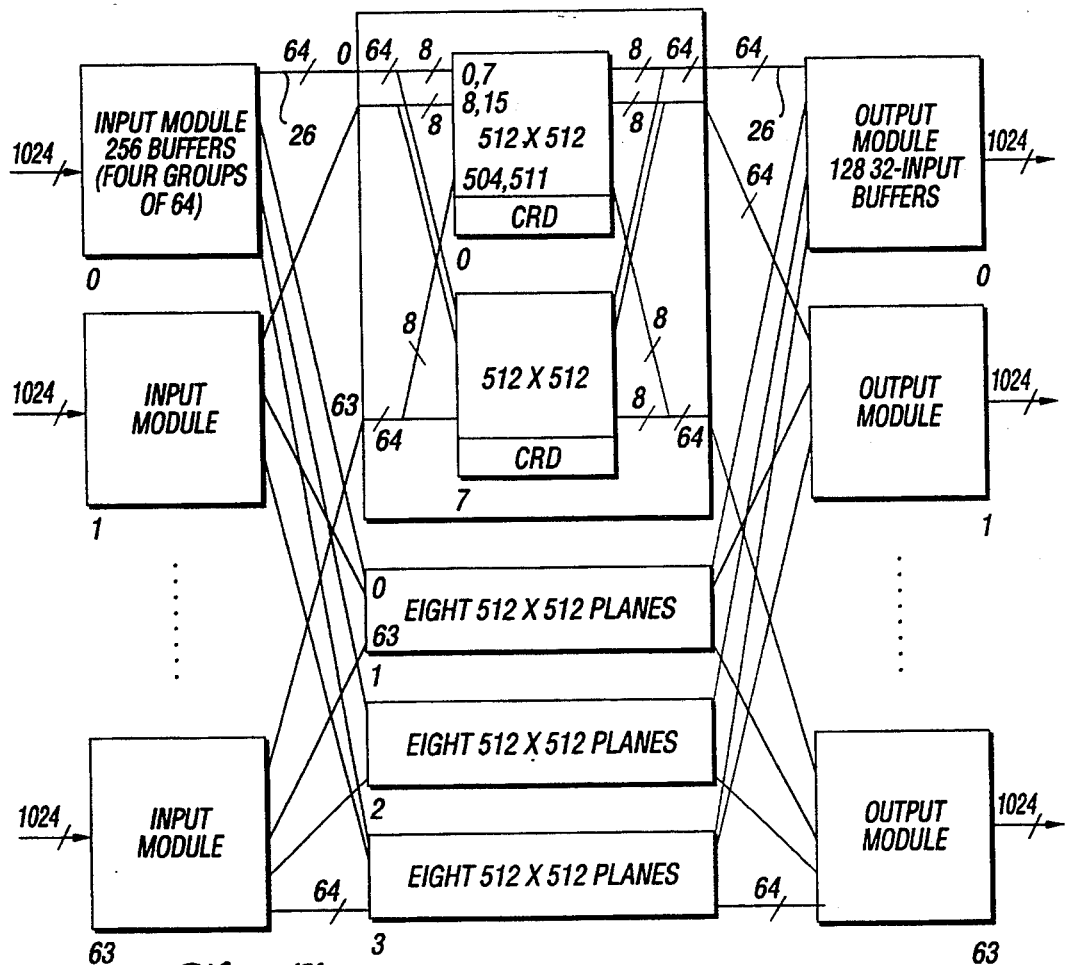
FIG. 7 is a schematic block diagram illustrating the interconnection of modules and switch planes.
Figure 8:
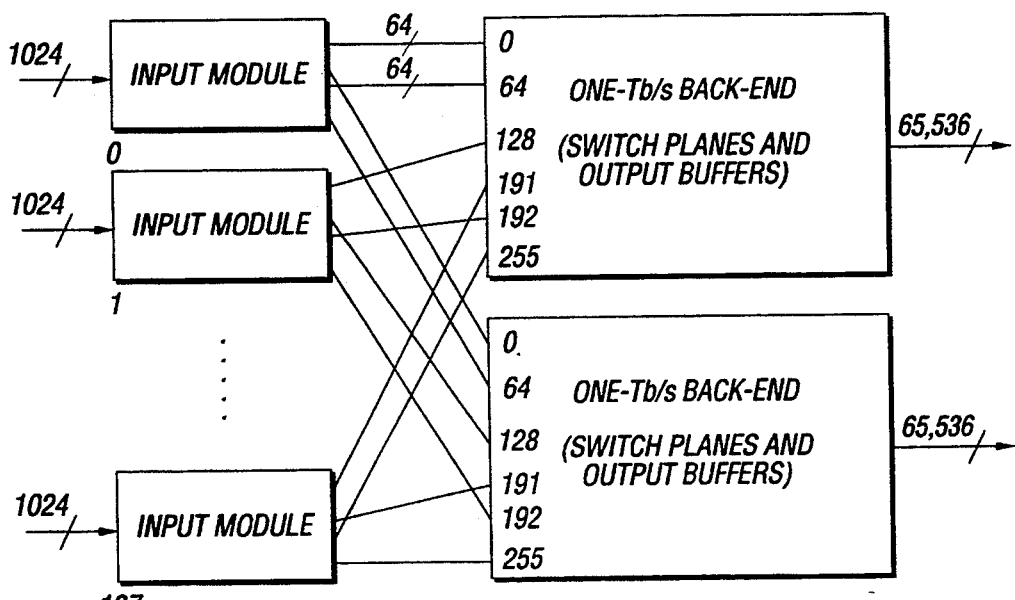
FIG. 8 is a schematic block diagram of a switch expanded to 2 Tb/s throughput.

The 16,384 input buffers can be grouped into 64 input modules, each containing 256 input buffers, as shown in FIGS. 6 and 7. Eight buffers in each module would connect to each of the 32 crosspoint switch planes. This interconnection could be done with four 10 Gb/sec optical ribbon interconnects, each containing 16 fibers operating at 622 Mb/sec and each connecting to a group of eight crosspoint planes.

As shown in FIG. 7, the outputs from the top input modules are consistently wired to the first eight inputs of each of the four crosspoint modules. This implies an unfair advantage to the top modules in port contention in the absence of fairness hardware. However, this effect can be mitigated within the large switch modules by distributing the 64 signals from a given input module to different input port numbers on each of the 8 switch planes. For example, the first eight inputs from the top input module could be connected to ports 0-7 in switch plane 0; the next eight could be connected to ports 64-71 in switch plane 1, etc.; with the last eight signals connected to ports 448-455 on switch plane 7. Obviously, other effective fairness balancing wiring arrangements within the switch module are also possible.

The complete switch would require 256 optical interconnect devices in the input buffer section to interface to the switch core. Using the 1 Mb ASIC Dram buffer technology, the complete switch fabric input buffer function would then require approximately 1280 chips. This does not include any input interface or concentration hardware.

If the input concentration is grouped with the input buffer modules, as suggested below, each input module would serve 1024 subscriber lines. This would be a convenient level of growth modularity for the switch.

Input Concentration

In traditional circuit switches, it is usually the case that concentration from physical user ports to active switch ports is considered to be a function separate from that of the switch-proper. At call setup, a line from a larger group of input ports is connected to a line from a smaller group of switch ports for the duration of the call. The concentration ratio is often on the order of 8:1.

The situation is different for an ATM switch, and it may be very difficult to design an optimal ATM switch unless the functions of concentration and switching are intimately tied together.

This is so for a number of reasons. First, because the traffic offered by a subscriber line is ATM and of greatly variable density, it would be wasteful at call setup to dedicate an active switch port to a single user port for the duration of the period during which there was any traffic at all.

Second, if one allows the concentrator to dynamically allocate switch port resources to subscriber ports during a call, then the question arises as to when it is safe to change the switch port to which a subscriber port is connected, recognizing that to do so while some of that port's cells were still in the previous switch queue would endanger the preservation of cell order.

Finally, because of the statistical nature of the ATM switch, not all of the input ports have the same characteristics versus time. For example, some queues may be much longer than others at any given time. A concentrator that is more intimately tied to the input portion of the switch can take advantage of this in dynamically allocating input queues to subscriber ports, effectively altering the statistics of the load offered to the switch in a favorable way.

Interactive Input Concentration

If the process of concentration is allowed to take into account the status of the subsequent switching fabric, such as input queue occupancy, that will be referred to herein as Interactive Input Concentration. An example of this would be as follows: when a subscriber port needs a switch port allocated to it, the least-busy queue in that concentration group of queues may be allocated. In some cases, this will automatically reduce the offered load to queues that are filling up due to HOL blocking. Furthermore, such an approach would provide for graceful failure degradation in the presence of input buffer failures because those queues would become unavailable for allocation to subscriber lines.

An Interactive Input Concentrator is shown ahead of the input buffers in the diagram of the Input Module of FIG. 6. This kind of dynamic concentration does not require more switching elements than would be in the concentrator anyway, but it may require that physical address translation be done prior to concentration and that some moderately fast control intelligence be added that can do the allocation based on the occupancy (or some other status measure) of the available group of queues. As described so far, this Interactive Concentration is done on a (subscriber) port-by-port basis. During the time a switch port 22 is allocated to a subscriber port, all cells enter the same switch queue.

Many algorithms for deciding when a subscriber line releases a queue and/or gets a new one are possible. In fact, a given subscriber line might work into several different queues on a cell-by-cell basis, depending on the destination of the given cells. This would be called cell-by-cell Interactive Concentration. It would almost surely require that physical address translation be done prior to concentration and would involve additional complexity in controlling the concentrator switching element.

The key constraint in either port-by-port or cell-by-cell interactive concentration is that the selected queue for cells from a given subscriber port and destined for a given output port must not be changed as long as any of that type cell is in the current queue. Enforcing this constraint preserves cell order. This requires that the control intelligence keep track of what types of cells are still in the various queues.

How a "type" of cell is defined and the circuit complexity required to enforce this constraint are what distinguishes the cost of implementing the two forms of Interactive Concentration. In the case of the port-by-port approach, this amounts to allowing a queue reassignment for a subscriber port only when the current queue to which that port is connected is empty. The cell-by-cell approach requires address comparisons and memory that correlates existing queue assignments with destination addresses.

The cell-by-cell approach would be more effective in mitigating the effects of heavy. HOL blocking in certain queues by tending to reduce the offered load to those queues. However, the use of the Scrambled Path or Path-Adaptive switch architectures may greatly reduce the need for further mitigation of HOL blocking effects.

Output Buffers

The output buffer switches, providing the ability to merge the signal paths from 32 independent small switches, are a key ingredient to the operation of this architecture. Each buffer has thirty-two 155 Mb/sec inputs, one from each like-numbered output port of the 32 crosspoint planes. The 32 inputs are effectively time-division multiplexed into the FIFO-like queue, requiring a very fast equivalent memory access time. Cells with a physical output port address matching that of the queue are entered. Others are ignored, as they will be entered into one of the other 15 queues connected in parallel with the same 32 input lines (for a total of $16 \times 512 = 8192$ output queues). As mentioned earlier, these 16 output buffers form an Output Buffer Group 12, shown in FIG. 4.

If interleaved access and equal write and read bandwidth is assumed (conservative; in principle, read bandwidth can be much less), then one needs 128 write/sense amplifiers with 12 ns row access time in what should probably be a high-speed 4-transistor DRAM memory fabric.

Back-Pressure Feedback

In the paper by I. Iliadis and W. Denzel, entitled "Performance of Packet Switches with Input and Output Queuing" INTERNATIONAL CONFERENCE ON COMMUNICATIONS, Atlanta, April 1990, it was suggested that switches employing both input and output buffering can achieve good performance with fairly small output buffers if "back-pressure" is applied when the output buffer capacity is about to be exceeded. Such back-pressure would force cells destined for these output ports to wait in the lower-cost input buffers until further clearing of the output buffer can occur. As a result, the cell loss probability due to output buffer overflow under bursty traffic conditions can be reduced.

In the architecture presented here, it may be possible to incorporate an efficient implementation of such back-pressure feedback by modifying the CRD. When a particular output queue is experiencing too much occupancy, ideally one would like to make only those cells targeted to that queue's physical address wait in their input queues. In practice, however, it is probably satisfactory to make all cells destined to that queue's entire Output Buffer Group of 16 queues wait, resulting in a brief 0.2% reduction in switch throughput.

This latter approach is simple to implement because a "killer" cell address can be entered into the 32 CRDs that always wins contention for the crosspoint plane output port feeding the identified Output Buffer Group 12. It is statistically unlikely that very many different killer addresses would have to be fed back and entered into the CRDs during any given cell period.

Output Buffer Implementation

It is assumed here that the output queue depth is 64 cells (it would probably have to be greater than 32 for reliable operation of the back-pressure scheme in this architecture anyway). This results in a memory size of less than 32 Kbits per output queue.

If one implements 8 output buffers per chip, one then has a chip with 256 Kb of fast (12 ns) memory in an ASIC DRAM or SRAM technology that is within today's technology capabilities. The chip would contain 512 write/sense amplifiers to achieve the required degree of parallelism. Two such chips would make up an Output Buffer Group 12.

Figure 4:
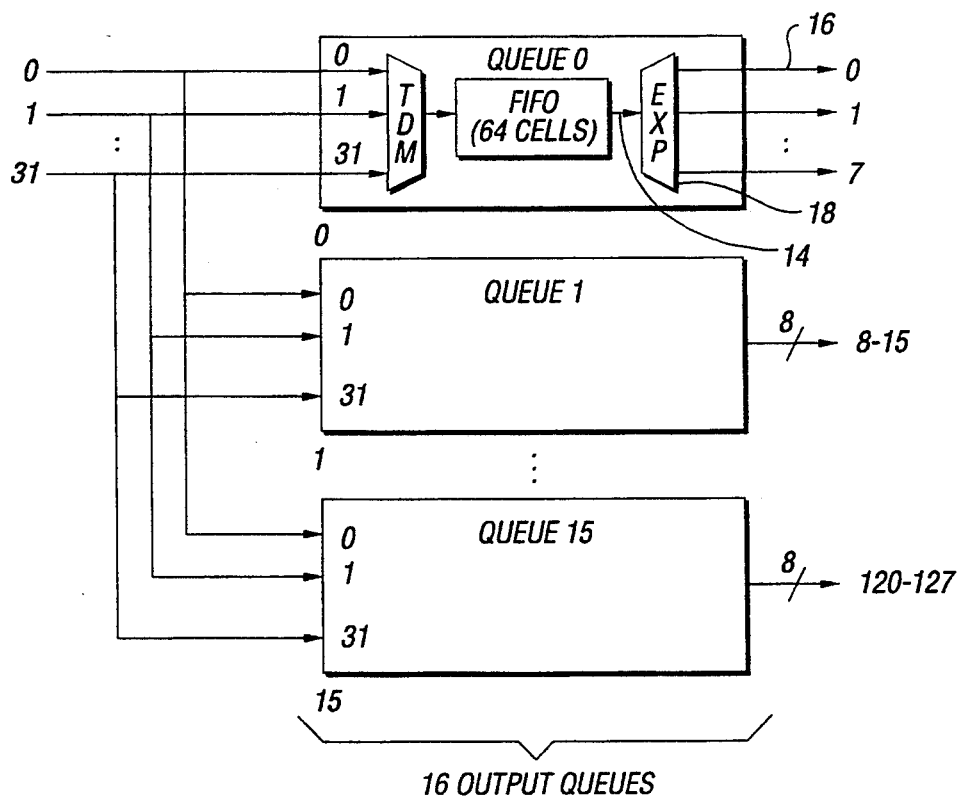
FIG. 4 is a more detailed schematic block diagram of an output buffer group shown in FIG. 3.

With an output expansion ratio of 8:1, each output buffer chip would serve 64 subscriber output ports. System cost would probably be reduced by incorporating the output expanders 18 on the output buffer chip as well, resulting in a chip with 64 STS-3 subscriber ports. The optional integrated output expander 18 is shown in FIG. 4.

There may be performance advantages in merging the output queue with the output expander 18 in the same chip, since one then has, at virtually no cost, more than the normal 155 Mb bandwidth linking the active switch output port with the expander 18, possibly improving throughput by allowing faster emptying of the output queue when cells near the head of the queue are destined for more than one of the subscriber ports to which the queue expands. This capability is achieved by taking advantage of the excess read bandwidth available in the output queue if symmetrical interleaving of read/write accesses is employed. If simple FIFO addressing is used, the extra emptying rate would be realized until two cells destined for the same subscriber port are encountered that are adjacent in the queue. This limitation would not apply if more complex shared buffer memory addressing was employed. Such an approach would begin to look like a virtual output buffer per subscriber port.

The output buffer can be arranged in modules that contain 128 output buffers and serve 1024 subscriber lines, as shown in FIG. 7. Again, 10 Gb/sec optical ribbon 26 interconnects can be used to connect the core switch planes to the input and output modules. Each output module would have four such ribbons connecting it to the switch planes, one ribbon to each group of eight planes. Each ribbon, carrying sixty-four 155 Mb/sec channels via sixteen 622 Mb/sec fibers, would connect to 8 output ports on each of the eight planes served.

With 256K fast memory technology employed to implement 8 output queues per chip, the switch requires 1024 output buffer chips. Including the total of 256 10 Gb/s optical interface chips, the total number of chips to realize the switch fabric output buffer function becomes 1280. This does not include output interface hardware, such as SONET formatting and any outgoing optical interconnect.

If 1 Mb fast memory technology and 622 Mb/sec outputs are employed for the expanded subscriber port outputs, only 256 output buffer chips are required. This is within reach of today's memory technology and would employ the same 622 Mb/sec I/O technology required to realize a 622 Mb/sec CMOS 64×64 crosspoint. The total for the output buffer function, including optical interconnect, would then be 512 chips.

Optical Ribbon Interconnect

The use of a 10 Gb/s optical interconnect technology has been assumed in the implementation of this switch. The assumptions regarding that technology are explored hereinbelow. From the above discussion, it is clear that an efficient interconnect technology is critical to the feasibility of this (and other) Terabit switch architectures. It is also clear that the relative amount of hardware devoted to interconnect is not insignificant.

The optical interconnect technology envisioned here would employ laser array technology wherein a 10 Gb/s link would be made with a ribbon of 16 fibers each carrying 622 Mb/s. The fibers in the ribbon would be coupled as a group through an array connector to the laser array on one end and an array of photoreceptors on the other end. The ribbon fiber connector should be made an integral part of the integrated circuit package that houses the optoelectronic chips. For example, it might be made part of the chip package solder lid. The kind of technology employed for alignment in an IC automated wire bonding operation might be suitable for achieving the necessary optical coupling alignment.

It is desirable that many portions of the switch be realized with a Multi-Chip Module (MCM) technology, probably involving the use of Tape Automated Bonding (TAB) chip attach technology. This is especially true of the crosspoint switching planes. For this reason, it is also important to develop a means of connecting a properly-aligned fiber ribbon to a TAB-mounted optoelectronic device die.

The lasers would probably operate at around 900 nm, and multimode fiber would be adequate and appropriate for the sub-kilometer distances involved. The use of multimode fiber would also relax the physical alignment tolerances required. This wavelength would also make it possible to employ a silicon photodetector, perhaps allowing the implementation of a single-chip receiver in BiCMOS technology. The lasers and photo receptors might be on a 250-micron grid to match the pitch that would be likely among the fibers in the fiber ribbon.

Synchronization and Transport Overhead

Intraswitch interconnect should involve a very simple, efficient transmission format, since raw cells are being transported. The use of a SONET format would seem quite wasteful in these applications. As mentioned above, 16 fibers each operating at 622 Mb/s and carrying cell information with no overhead (other than cell tag information that has been mentioned earlier) is envisioned.

In addition to the 16 data fibers, four more fibers could be added to make up a 4×5 fiber ribbon array. These fibers could carry clock, cell synchronization, and other overhead data for the group of 16 data fibers. One fiber would carry clock in the form of a ¼-rate clock (155 MHz), making clock recovery or phase alignment in the receiver very simple. The transmission of a ¼-rate clock is attractive because it has similar characteristics, such as transition density, to the data and is no more difficult to transmit than data. Such a clock reference signal can also be used in the receiver to establish a good input signal decision threshold for all of the other optical receivers on the chip by employing servo techniques to control the decision threshold to achieve a 50-percent clock duty cycle, as received.

A second fiber could carry a cell border sync pulse. If circuit density permits it, the receiver should perform the necessary re-alignment of cell borders to the common cell border needed in the receiving system function.

The remaining two overhead fibers could be employed for parity, error correction, or other functions. Another possible use for one of these fibers is to code the group of 16 data lines in such a way as to keep the total laser "on" duty cycle always at or below 50 percent in order to save power. The information carried on this fiber would indicate whether the sense of the information on the data fibers has been inverted or not, on a bit-time by bit-time basis. These extra fibers could help the receiver to monitor the health of the link as well.

Failure Characteristics

The parallel organization of this switch leads to graceful failure degradation in all parts of the switching path that carry large cross-sections of traffic. This is accomplished without replication involving protection switching.

If one of the 32 switch planes fails, the path assignment switches in the Input Buffer Groups 10 evenly distribute the loss of throughput across the input queues that are served (as long as that switch plane's CRD returns no winner indications). Switch throughput is then reduced uniformly by 3.1 percent. This is also true if one of the 512 CRDs fails.

If a single input buffer fails, it is marked as unavailable to the concentrator and throughput available to that module decreases by 1/256=0.4%. If an input buffer chip fails, all 16 of its buffers are marked as unavailable and throughput available to that module decreases by 6%. If an entire 10 Gb/s optical ribbon 24 interconnect fails, throughput of the affected input module drops by 25%. The detailed implementation of the concentrator will affect its failure characteristics. In some cases replication may be desirable there.

Failures in output buffers or output buffer chips do not degrade gracefully, but the failure cross-section is small (8 active switch ports for an output buffer chip, corresponding to 64 subscriber ports). Failure of an optical ribbon 26 connecting the switch core to an output module is more serious because each such ribbon carries 64 155 Mb/sec signals, four from each of eight planes, to a given output module. The most straightforward thing to do in this case is to make unavailable all eight of the planes feeding this ribbon, resulting in a 25% reduction in switch throughput.

Cell Loss and Delay Characteristics

Cell loss occurs whenever there is blocking in the switch fabric or whenever a queue overflows. This architecture employs a non-blocking switch core so the first cause is not at issue.

The issue of overflow of the queues involves reasonable sizing of the queues, management of throughput degradation of the switch under particular loads, and attainment of acceptable cell delay characteristics. To a point, making the buffers larger reduces the cell loss probability, but if this extra memory gets occupied it implies longer maximum cell delay. As mentioned hereinabove, because this is an input-buffered switch, one assumes that throughput is only 58% under uniformly distributed random traffic. This has been addressed by simply overbuilding the switch by a factor of two. The remaining question is how the switch performs under bursty traffic where further throughput degradation may occur which could lead to long maximum cell delays and ultimately to cell loss due to buffer overflow.

Compared to an idealized single-switch-plane input-buffered switch, there are some reasons to expect better performance from this architecture under bursty loads. First, the multiplicity of paths to a given output port means that a peak bandwidth of 32 cells per cell period is available to each output port. This is a direct result of the use of output buffering in the second stage. Furthermore, if the output expansion is integrated with the wideband output buffer, faster scavenging of the output buffer can take place on the average (i.e., greater than one cell per cell period may be removed from the output queue).

On the input side, the use of the Scrambled Path or Path-Adaptive switch architecture should tend to reduce the effects of bursty input traffic. This should reduce both the average and peak queue occupancy, and thus reduce peak cell delay and cell loss probability.

The fact that the concentrator will tend to avoid further allocation of cells to busy input queues will help reduce the probability of overflowing those queues and will also tend to reduce the delay encountered by new cells entering the switch. The Interactive Concentrator effectively alters the statistics of the offered load so as to reduce the bad effects of bursty traffic and consequent HOL blocking.

Finally, if the back-pressure feedback scheme is used, wherein an output buffer in danger of overflow makes cells wait in the input queue, the "pain" is more evenly distributed across the switch resources and cell loss probability is reduced.

Expansion to Larger Switches

The invention provides a completely nonblocking architecture that does not depend on statistics to minimize cell losses in the switching fabric (i.e., as long as the buffers do not overflow). This architecture has a peak throughput of greater than 2 Tb/sec and a sustained throughput of over one Tb/sec with uniformly distributed random input traffic. If one wishes to build a larger switch, say 2 Tb/sec sustained, one could simply double the number of input modules, double the number of switch planes, and double the number of output modules. However, if one were to keep within the spirit of the current architecture, the output buffers would have to have double the number of simultaneous inputs (64 instead of 32). In effect, the aggregate number of 155 Mb/sec input lines consumable by all of the output buffers is increasing by N squared, violating the otherwise linear growth of the rest of the key components of the switch.

An evolutionary version of the above architecture that can grow beyond one Tb/sec without increasing the bandwidth of the output queues and which can continue to employ the same input and output modules as the non-expanded switch is desirable. One can do this by beginning to depend on statistics to preserve good fabric performance in the hope that at the 1 Tb/sec and above size the cross-sections are large enough for these desirable statistical properties to come into play so as to keep blockage and other effects small enough to achieve very low cell loss probabilities. One also seeks to achieve this expansion without further complicating the interconnect among the input modules, switch planes and output modules.

The desired growth characteristic above 1 Tb/sec is achieved by relaxing the requirement that every input module has access to every switch plane. In doubling the switch size, for example, two independent 1 Tb (sustained) "back ends" consisting of switch planes and output modules are built, as shown in FIG. 7. Then 2048 input modules instead of 1024 input modules are employed. In the base architecture, the four 10 Gb optical ribbons from a given input module go to four switch plane groups of eight planes each.

In the 2:1 expanded architecture, some minor interleaving of the routing of the optical ribbons is done among the two back ends, so that each input module has two ribbons going to each of the back ends. A given input module thus has access to only half of the 32 switch planes of each back end. This requires that the input concentrator route input cells to one of two groups of input queues depending on an added most significant bit MSB in the physical address field of the cell. The 256 input queues in each module are thus grouped as two groups of 128 queues in accordance with which switch back end they are connected to.

The penalty in this approach is that each input module can only direct half of its throughput to each Tb worth of output ports. One must thus depend on some statistical balancing of the destinations of the cells in each input module.

In a sense, a modest third stage of switching has been incorporated into concentrator hardware that was already there. Yet another way of looking at it is that two 1-Tb switches have been built, each with an input concentration factor of 16:1, with every input port having parallel access to both switches. Although the base architecture switch is referred to as having a concentration factor of 8:1 based on sustained throughput, it can also be thought of as having a concentration factor of only 4:1 based on physical access to input queues (1024 subscriber lines have access to 256 input queues in an input module).

This means of further switch growth is another example of the possible benefits of having a more intimate relationship between the concentrator and the input structure of the switch.

A four Tb switch could be implemented in a like manner by having only one of the optical ribbons from an input module go to each of the four back ends.

Extension to Faster Switches

As alluded to earlier, if 622 Mb/sec CMOS crosspoints are available, building a switch that can handle STS-12 traffic while preserving cell ordering at this rate is fairly straightforward with this architecture. Even the input and output buffer technology (e.g., internal memory access speed) would remain essentially unchanged with the exception that the I/O rate on some of the pins would be increased to 622 Mb/sec (same I/O technology as the 622 Mb/sec crosspoints). One fourth as many CRDs that each operate four times as fast would be required (implying a possible CRD complexity increase).

Although most of the architecture and features of the invention have been described in the context of a very large switch, it should be evident that virtually all aspects of the invention can be very advantageous to and compatible with smaller switches.

Application To Smaller Switches

Most of the specification has dealt thus far with illustrating problems and solutions for very large ATM switches, where the growth and scalability highlight these issues. However, the techniques within the scope of this invention are equally effective and compatible with small switch architectures. FIG. 9 illustrates a 256-by-256 STS-3 ATM switch based on the principles and techniques disclosed herein. The illustration of this smaller, simpler version of the architecture may further clarify the techniques of this invention and will also serve to aid the forthcoming revisitation of the issue of fairness in contention resolution.

The switch is comprised of five major types of elements, all of which have been discussed previously. Here, however, these elements can each be thought of as being incorporated in a single VLSI chip realizable with today's technology capabilities. An input module 91 contains 32 input buffers, each about 64 or 128 cells deep and organized in FIFO fashion. Sixteen of such modules are shown and account for the 512 input ports of the switch, reflecting a 2:1 over-building of the switch. An input module with 16 dual-output buffers would also work.

A path selection switch 92, whose setting does not affect ultimate cell destination, includes a 32×32 forward signal crosspoint router and a 32×32 reverse win/lose contention result router. It may be able to integrate the switch 92 on the same chip as the input module 91.

A 32×32 central switch fabric crosspoint switch plane 93 includes an integral contention resolution device (CRD) which resolves contention over its 32 input ports. For drawing clarity, wiring between these pieces is shown in groups of 2 channels. Each module is thus shown with 16 input/output groups.

An output module 94 includes 16 output buffers organized as an output-buffered switching element with 32 inputs, as described earlier.

A fifth element, a path controller 95, implements a path-selection algorithm such as the scrambled path approach or the path-adaptive approach. The path controller 95 may also be most advantageously implemented in each of the input module chips. With the above-mentioned integration of the path selection switching and control into the input modules, all of the major functionality of a 256×256 ATM switch can be incorporated within a limited number of chips having only three different chip designs.

An Alternative To Fairness Towards—Lossless ATM Switches

The issue of fairness in contention resolution, particularly in the contention resolution device, has been previously discussed. It is considered to be important by most switch designers to achieve fairness in the CRD, even though it can make the CRD a significantly more challenging function to implement. Earlier in this specification, it was suggested that fairness is unimportant as long as all signals get through the switch with an adequately low cell loss probability and with adequately low delay. Here it is suggested that a very simple CRD with no fairness can actually meet these needs when incorporated in a switch of the present invention if an appropriate path adaptation method is employed. In essence, the switch performance criteria mentioned above that are normally achieved via fairness in contention resolution are instead here assured by proper control of path selection.

A very simple CRD with no fairness circuitry simply implements a pairwise comparison among the contending input destination addresses by shifting the group of them past a stationary group of them. This architecturally fixed ordering of comparisons results in predictable unfairness: the lower-numbered inputs at the top of the array of inputs (assuming the shifted group is shifted downward in a circular fashion) are given preference in winning contention over inputs whose comparison takes place later in the sequence of shiftings.

Most ATM switches are essentially of fixed architecture and are therefore at the mercy of the statistics of the traffic; if they are well designed and significantly over-built, the cell loss probability can be made very low. However, because of the statistical nature of the process, the loss probability can normally not be made zero, and can be very difficult to get very low under pathological traffic statistics. The switch architecture of this invention, however, is in a sense "architecturally agile", in that the path selection feature essentially changes the wiring and architecture of the switch in real time without affecting cell destination or ordering. The ability of the switch to adapt to traffic statistics makes it possible for the switch to no longer be at the mercy of the traffic statistics.

An ordinary switch of fixed architecture may have a loss probability of 10E-9, meaning that it is a relatively rare occasion that any input buffer is so full that it overflows (the case of cell loss). And yet, on that rare but inevitable occasion, one of the input buffers overflows, and the switch can do nothing about it. If such a switch could make a minor alteration in its architecture in the right way under these conditions (such as mitigating one or a few specific contention conditions), then the overflow could be prevented and the switch might for all practical purposes become essentially lossless.

The path adaptation capability of the switch of the present invention essentially gives the switch such an ability to alter its architecture so as to avoid buffer overflow. This is workable because if the switch was otherwise designed to have a 10E-9 cell loss probability, only a very small portion of the switch can be in danger of overflow at any given time, and only a very slight alteration of switch behavior or diversion of switch resources to the right place (in a suitably autonomous way) will be needed to prevent overflow.

This is an example of how predictable preference, as opposed to statistical fairness, in the contention resolution device can be used to advantage. By simple example, if a buffer in danger of overflow is given a new switch path which is connected to the first port of a crosspoint switch plane (which is the most preferred by the simple CRD), it will begin to always win contention and will get out of trouble. This alteration of switch architecture is done at the expense of the contention winning probability of another buffer, but one which is not in danger of overflow and can afford to lose some contentions. In a sense, an unfair advantage is given to those very few input buffers in danger of overflow at any given time.

The architecture of the 256×256 switch in FIG. 9 illustrates a switch that takes advantage of this principle. The CRDs of the central crosspoint switch plane 93 are assumed to be of the simple "unfair" type, giving first preference in contention to the lowest-numbered input ports of the crosspoint. The wiring between the path selection switches 92 and the crosspoints 93: (1) makes available to each input buffer access to any of the 16 crosspoint switches (paths); and (2) makes available to each input buffer module 91 a selection of contention resolution priority is dependent on which crosspoint switch plane that is chosen. For example, the first input module has access to ports 0 and 1 of crosspoint switch plane zero (high CRD preference), to ports 2 and 3 of crosspoint switch plane 1, on down to ports 30 and 31 (low CRD preference) on crosspoint switch plane 15. Thus, every input module can connect one of its input buffers to a crosspoint switch plane or path where it is sure to win contention. It also has a selection of other paths with very high probability of winning contention. For those buffers which are not very full, they can be connected to a selection of paths that are subject to relatively low preference in contention resolution. However, these buffers will also frequently win because there will not always be contention for the same output port.

The path controller 95 for a given input module can intelligently manage its path and priority resources over its 32 input buffers. The predictable preference available to the various outputs of the path selection switch 92 also makes priority assertion easier. That is, a switch input port identified to have higher priority for reduced cell loss probability, delay or jitter, can be given a higher contention resolution priority at lower threshold of buffer fullness (or rate of buffer fullness increase) than other buffers in the same input module that are not so identified.

Even if overflow of input buffers can be prevented by intelligent adaptive path selection in this architecture, achieving a lossless or near-lossless ATM switch also requires that output buffers not overflow. Overflow of output buffers can occur if too many inputs direct too large an aggregate amount of information to one output port over too long a period, even if the long term average information rate directed at the port is within the bandwidth limit of the port. The use of back pressure feedback, as mentioned earlier in this specification, can completely prevent such output buffer overflow, and the resultant additional storage loading reflected back to the input buffers can be effectively handled by the adaptive path selection approach described above.

While back-pressure feedback can virtually always be successfully employed to prevent output buffer overflow, the amount by which its action reduces the throughput capability of the switch depends on how sophisticated its implementation is. Because the probability of output buffer overflow is expected to be low in a properly designed switch in the first place, one can argue that the momentary reduction of switch throughput resulting from its action (which will not necessarily be correlated with instances of contention resolution in the central crosspoint switch planes) can be handled by the switch without seriously increased chance of input buffer overflow.

On the other hand, the same argument can be made for a more precise form of back-pressure feedback that targets cells destined for a particular output buffer in danger of overflow. Because only a very few output buffers should be in danger of overflow at any given time, it is practical to collect only those destination addresses of the few most full buffers and return them to the input modules for comparison with the destination addresses of cells at the heads of the buffer queues. A successful comparison will cause the buffer to be blocked for that cell cycle, just as if it had lost a contention. However, if one of the buffers with cells destined for the targeted output queue is itself in danger of overflow, then that buffer will not be blocked. Thus, the back pressure of information is automatically absorbed by input buffers that are most able to absorb it.

Summary

A terabit ATM switch fabric architecture has been described herein that achieves essentially linear complexity growth with N by employing parallelism. The parallelism also provides convenient modularity and robust failure characteristics. Although an input buffered switch, the design achieves a parallel combination of central switching planes by means of an output-buffered second stage. A path-assignment switching stage is employed to alter traffic statistics within the switch to suppress blocking and reduce throughput degradation in the presence of correlated traffic. The advantages of close integration of the input concentration and output expansion functions with the switch fabric are also described.

While the best mode for carrying out the invention has been described in detail, those familiar with the art to which this invention relates will recognize various alternative designs and embodiments for practicing the invention as defined by the following claims.

What is claimed is:

1. A switch for routing information cells having destination addresses from input ports of the switch to output ports of the switch on a cell-by-cell basis, the switch comprising:

a plurality of input buffers having outputs for storing the information cells, the input buffers being arranged in one or more groups;

a central switch fabric including a plurality of crosspoint switch switching planes having inputs and outputs, each of said switching planes having a constant signal delay that is the same for all of the switching planes, a path switch associated with each group of input buffers for selectively connecting the signals appearing on the outputs of the buffers of that group to the inputs of the plurality of switching planes;

a plurality of contention resolution devices (CRD), one CRD being associated with each of said switching planes for resolving contention among the information cells for access to the outputs of said switching plane on the cell-by-cell basis, each CRD providing indication signals for winning and losing information cells;

a feedback path means for communicating win/lose signals from the CRDs back to the plurality of input buffers from which the winning and losing information cells originated, said feedback path means maintaining routing correspondence between input buffers and switching planes for both the signals traveling in a forward direction and the associated win/lose contention signals traveling in a reverse direction; and an output buffered switch including a plurality of output buffers arranged in one or more groups for receiving the information cells from the outputs of the plurality of switching planes for routing the information cells to the proper output port of the switch in accordance with destination addresses of the information cells.

2. The switch as claimed in claim 1 further comprising path controller logic means for asserting routing priority for information cells and wherein the path switch is a crosspoint switch controlled by the path controller logic means.

3. A method for routing cells from input ports to output ports of an ATM switch, the method comprising the steps of:

providing a plurality of switching planes having inputs and outputs;

storing the cells appearing on the input ports of the ATM switch in a plurality of input queues;

assigning the input queues to the inputs of the switching planes in a controlled fashion to more uniformly distribute the flow of cells across the switching planes, the switching planes routing cells along paths therethrough to the outputs of the switching planes in parallel;

combining and storing the cells appearing on the outputs of the switching planes; and retrieving and applying the combined stored cells to the output ports of the ATM switch; and wherein the step of assigning is controlled so that the paths of the stored cells from the input queues to the switching planes are scrambled.

4. A system for routing cells from input ports to output ports of an ATM switch, the system comprising:

a plurality of switching planes having inputs and outputs;

means for storing the cells appearing on the input ports of the ATM switch, the means for storing including a plurality of input queues;

means for assigning the input queues to the inputs of the switching planes in a controlled fashion to more uniformly distribute the flow of cells across the switching planes, the switching planes routing cells along paths therethrough to the outputs of the switching planes in parallel;

means for combining and storing the cells appearing on the outputs of the switching planes; and means for retrieving and applying the combined stored cells to the output ports of the ATM switch and wherein the means for assigning controls the assignment of the paths of the stored cells from the input queues to the switching planes in a scrambled fashion.

5. A switch for routing information cells having destination addresses from input ports of the switch to output ports of the switch, the switch comprising:

a plurality of input buffers having outputs for storing the information cells, the input buffers being arranged in one or more groups;

a central switch fabric including a plurality of switching planes having inputs and outputs;

a path switch associated with each group of input buffers for selectively connecting the signals appearing on the outputs of the buffers of that group to the inputs of the plurality of switching planes;

a plurality of contention resolution devices (CRD), one CRD being associated with each of said switching planes for resolving contention among information cells for access to the outputs of said switching plane, each CRD providing indication signals for winning and losing information cells;

a feedback path means for communicating win/lose signals from the CRDs back to the plurality of input buffers from which the winning and losing information cells originated; and an output buffered switch including a plurality of output buffers arranged in one or more groups for receiving the information cells from the outputs of the plurality of switching planes for routing the information cells to the proper output port of the switch in accordance with destination addresses of the information cells; and wherein the switch further comprises path controller logic means for asserting routing priority for information cells and wherein the path switch is a crosspoint switch controlled by the path controller logic means.

6. A switch for routing information cells having destination addresses from input ports of the switch to output ports of the switch, the switch comprising:

a plurality of input buffers having outputs for storing the information cells, the input buffers being arranged in one or more groups;

a central switch fabric including a plurality of switching planes having inputs and outputs;

a path switch associated with each group of input buffers for selectively connecting the signals appearing on the outputs of the buffers of that group to the inputs of the plurality of switching planes;

a plurality of contention resolution devices (CRD), one CRD being associated with each of said switching planes for resolving contention among information cells for access to the outputs of said switching plane, each CRD providing indication signals for winning and losing information cells;

a feedback path means for communicating win/lose signals from the CRDs back to the plurality of input buffers from which the winning and losing information cells originated; and an output buffered switch including a plurality of output buffers arranged in one or more groups for receiving the information cells from the outputs of the plurality of switching planes for routing the information cells to the proper output port of the switch in accordance with destination addresses of the information cells; and wherein the switch further comprises means for preventing output buffer overflow, said means for preventing collecting addresses of the most occupied output buffers, feeding the addresses back to the input buffers, performing address comparisons, and, inhibiting operation of said input buffers having head-of-line information cells destined for said most occupied output buffers, said means for preventing being inoperative with respect to any input buffers in danger of overflow.

7. A method for routing cells on a cell-by-cell basis from inputs and outputs of an ATM switch comprising a plurality of switching planes having inputs and outputs, said switching planes comprising crosspoint switch planes each having a contention resolution device for resolving contentions between cells, the method comprising the steps of:

storing the cells appearing on the input ports of the ATM switch in a plurality of input queues;

assigning the input queues to the inputs of the switching planes in a controlled fashion to more uniformly distribute the flow of cells across the switching planes, the switching planes routing cells along paths therethrough to the outputs of the switching planes in parallel on a cell-by-cell basis;

combining and storing the cells appearing on the outputs of the switching planes;

retrieving and applying the combined stored cells to the output ports of the ATM switch; and communicating contention resolution information concerning resolved contentions so as to control the step of assigning in a manner responsive to the contention resolution information.

8. A system for routing cells from input ports to output ports of an ATM switch on a cell-by-cell basis, the system comprising:

a plurality of crosspoint switch switching planes having inputs and outputs, each of the switching planes having a contention resolution device for resolving contentions between cells;

means for storing the cells appearing on the input ports of the ATM switch in a plurality of input queues;

means for assigning the input queues to the inputs of the switching planes in a controlled fashion to more uniformly distribute the flow of cells across the switching planes, the switching planes routing cells along paths therethrough to the outputs of the switching planes in parallel on the cell-by-cell basis;

means for combining and storing the cells appearing in the outputs of the switching planes;

means for retrieving and applying the combined stored cells to the output ports of the ATM switch; and means for communicating contention resolution information concerning resolved contentions so as to control the means for assigning in a manner responsive to the contention resolution information.

9. A switch for routing information cells having destination addresses from input ports of the switch to output ports of the switch on a cell-by-cell basis, the switch comprising:

a plurality of input buffers having outputs for storing the information cells, the input buffers being arranged in one or more groups;

a central switch fabric including a plurality of switching planes having inputs and outputs;

a path switch associated with each group of input buffers for selectively connecting the signal appearing on the outputs of the buffers of that group to the inputs of the plurality of switching planes;

interconnecting means for interconnecting the path switches and the switching planes so that different signal paths selectable by the path switch are characterized by different sets of signals in contention for outputs of the switching planes;

a plurality of contention resolution devices, one device being associated with each of said switching planes for resolving contention among information cells for access to the outputs of said switching plane on the cell-by-cell basis, each contention resolution device providing indication signals for winning and losing information cells;

a feedback path means for communicating win/lose signals from the contention resolution devices back to the plurality of input buffers from which the winning and losing information cells originated; and an output buffered switch including a plurality of output buffers arranged in one or more groups for receiving the information cells from the outputs of the plurality of switching planes for routing the information cells to the proper output port of the switch in accordance with destination addresses of the information cells; and wherein each signal path selectable by a path switch traverses the central switching fabric through a different switching plane.

10. The method as claimed in claim 7 wherein the step of assigning is controlled so that the paths of the stored cells from the input queues to the switching planes are scrambled.

11. The method as claimed in claim 3 wherein the cells have a cell period and wherein the step of assigning is performed at substantially each cell period so that the paths are scrambled on each cell period.

12. The method as claimed in claim 7 wherein the step of assigning is controlled in an adaptive fashion wherein the step of assigning is based on the cell occupancies of the input queues.

13. The method as claimed in claim 7 wherein each of the cells has a switch routing tag and wherein the method further comprises the step of routing the cells to the input queues based on the switch routing tags of the cells.

14. The method as claimed in claim 13 wherein the step of routing is based on the cell occupancies of the input queues.

15. The system as claimed in claim 8 wherein the means for assigning controls the assignment of the paths of the stored cells from the input queues to the switching planes in a scrambled fashion.

16. The system as claimed in claim 4 wherein the cells have a cell period and wherein the alignment of the paths is performed at substantially each cell period so that the paths are scrambled on each cell period.

17. The system as claimed in claim 8 wherein the means for assigning controls the assignment of the paths of the stored cells from the input queues to the switching planes in an adaptive fashion so that the assignment of the paths is based on the cell occupancies of the input queues.

18. The system as claimed in claim 8 wherein each of the cells has a switch routing tag and wherein the system further comprises means for routing the cells to the input queues based on the switch routing tags of the cells.

19. The system as claimed in claim 18 wherein the means for routing routes the cells based on the cell occupancies of the input queues.

20. The switch as claimed in claim 5 further comprising interconnecting means for interconnecting the path switches and the switching planes so that the signals on the output of any input buffer in a group can be connected to an input of any one of a plurality of different switching planes.

21. The switch as claimed in claim 5 wherein the feedback path means for communicating win/lose signals to the input buffers is a crosspoint switch controlled by the path controller logic means so as to maintain routing correspondence between input buffers and switching planes for both the signals traveling in a forward direction and the associated win/lose contention signals traveling in a reverse direction.

22. The switch as claimed in claim 5 further comprising interconnecting means for interconnecting the path switches and the switching planes so that different signal paths selectable by the path switch are characterized by different sets of signals in contention for outputs of the switching planes.

23. The switch as claimed in claim 5 wherein the one CRD associated with each of said switching planes of the central switching fabric is characterized by a known fixed preference for certain contending information cells as a function of which inputs of the switching plane and its associated CRD the contending information cells appear;

and wherein each path switch is interconnected to a plurality of switching planes such that the group of input buffers attached to each path switch has available a plurality of paths and a plurality of contention priorities;

and wherein the path controller logic means includes logic means to assure that any given input buffer is assigned to a path with adequate contention priority so as to avoid input buffer overflow.

24. The switch as claimed in claim 23 wherein the path controller logic means asserts routing priority for certain identified information cells so as to achieve desired enhanced switching performance for the identified information cells, such as further reduced cell loss probability, reduced cell delay, reduced cell jitter, and the like, as a function of the known fixed preference and the information cell occupancies of the input buffers.

25. The switch as claimed in claim 5 further comprising means for preventing overflow of one of the output buffers, said means for preventing providing a feedback signal to the plurality of CRDs to control the flow of information cells to the one of said output buffers or the group of output buffers of which said one is a member.

* * * * *